US009530011B2

(12) United States Patent
French

(10) Patent No.: US 9,530,011 B2
(45) Date of Patent: Dec. 27, 2016

(54) METHOD AND SYSTEM FOR PROVISION OF CRYPTOGRAPHIC SERVICES

(75) Inventor: George French, Bedford (GB)

(73) Assignee: Barclays Bank PLC, London (GB)

( * ) Notice: Subject to any disclaimer, the term of this patent is extended or adjusted under 35 U.S.C. 154(b) by 0 days.

(21) Appl. No.: 13/379,736

(22) PCT Filed: Jun. 22, 2010

(86) PCT No.: PCT/GB2010/051034
§ 371 (c)(1),
(2), (4) Date: Feb. 8, 2012

(87) PCT Pub. No.: WO2010/150008
PCT Pub. Date: Dec. 29, 2010

(65) Prior Publication Data

US 2012/0131354 A1 May 24, 2012

(30) Foreign Application Priority Data

Jun. 22, 2009 (GB) .................................. 0910765.7

(51) Int. Cl.
*G06F 7/00* (2006.01)
*G06F 21/60* (2013.01)
*H04L 9/08* (2006.01)
*H04L 9/32* (2006.01)

(52) U.S. Cl.
CPC ............ *G06F 21/602* (2013.01); *H04L 9/088* (2013.01); *H04L 9/3213* (2013.01); *H04L 9/3271* (2013.01); *G06F 2221/2101* (2013.01); *H04L 2209/38* (2013.01)

(58) Field of Classification Search
USPC ....... 713/189, 150, 151, 152, 155, 156, 157, 713/158, 171, 175, 176; 726/27, 1, 26; 380/28, 277, 278; 705/59
See application file for complete search history.

(56) References Cited

U.S. PATENT DOCUMENTS

| | | | | |
|---|---|---|---|---|
| 5,661,806 | A * | 8/1997 | Nevoux ................ | H04L 9/0844 380/247 |
| 6,397,330 | B1 | 5/2002 | Elgamal et al. | |
| 6,715,077 | B1 | 3/2004 | Vasudevan et al. | |

(Continued)

FOREIGN PATENT DOCUMENTS

| | | |
|---|---|---|
| EP | 1 473 618 A2 | 3/2004 |
| EP | 0 043 073 A1 | 1/2009 |

(Continued)

OTHER PUBLICATIONS

PCT International Preliminary Report on Patentability, PCT/GB2010/051034, dated Jan. 4, 2012 (11 pages).

(Continued)

*Primary Examiner* — Sayed Beheshti Shirazi
(74) *Attorney, Agent, or Firm* — Morgan Lewis & Bockius LLP

(57) ABSTRACT

An encryption service system comprises an API for receiving requests from one or more calling applications. Each request comprises information identifying the operations to be performed on data to be processed and information identifying the origin and target of the data. The encryption service system further comprises a cryptographic server for processing the requests and determining, for each request, an encryption policy to be applied.

41 Claims, 4 Drawing Sheets

(56) References Cited

U.S. PATENT DOCUMENTS

| | | | | |
|---|---|---|---|---|
| 7,174,563 | B1 * | 2/2007 | Brownlie | G06F 21/33 709/223 |
| 7,953,978 | B2 * | 5/2011 | Greco | H04L 63/062 380/278 |
| 8,370,437 | B2 * | 2/2013 | Duffek | G06Q 10/107 709/206 |
| 8,768,853 | B2 * | 7/2014 | Shastry | G06Q 20/04 705/39 |
| 2002/0078348 | A1 | 6/2002 | Leung et al. | |
| 2003/0005300 | A1 | 1/2003 | Noble et al. | |
| 2004/0179684 | A1 | 9/2004 | Appenzeller et al. | |
| 2005/0120206 | A1 | 6/2005 | Hines et al. | |
| 2005/0216418 | A1 * | 9/2005 | Davis | H04L 63/0428 705/59 |
| 2006/0005034 | A1 * | 1/2006 | Willman | G06F 21/575 713/182 |
| 2006/0149962 | A1 * | 7/2006 | Fountain | H04L 63/0428 713/151 |
| 2006/0155715 | A1 * | 7/2006 | Duffek | G06Q 10/107 |
| 2006/0204003 | A1 * | 9/2006 | Takata | H04L 9/083 380/30 |
| 2006/0291664 | A1 * | 12/2006 | Suarez | G06F 21/33 380/286 |
| 2007/0011736 | A1 | 1/2007 | Kalibjian et al. | |
| 2007/0056043 | A1 * | 3/2007 | Onyon | G06F 21/88 726/26 |
| 2007/0297610 | A1 | 12/2007 | Chen et al. | |
| 2008/0181404 | A1 * | 7/2008 | Matsuki | H04L 63/0435 380/259 |
| 2008/0232592 | A1 | 9/2008 | Lee et al. | |
| 2008/0262861 | A1 * | 10/2008 | Episale et al. | 705/1 |
| 2009/0028339 | A1 * | 1/2009 | Goodman | G06F 21/80 380/278 |
| 2009/0037338 | A1 * | 2/2009 | Braun | G06Q 10/107 705/60 |
| 2009/0080649 | A1 * | 3/2009 | Dellow | H04L 9/0637 380/44 |
| 2009/0141902 | A1 | 6/2009 | Thywissen | |
| 2009/0254997 | A1 * | 10/2009 | Yassa | G06F 21/10 726/27 |
| 2009/0327695 | A1 * | 12/2009 | Molsberry | H04L 63/20 713/151 |
| 2010/0061555 | A1 * | 3/2010 | Ducharme | G06F 21/602 380/277 |
| 2010/0153702 | A1 * | 6/2010 | Loveless | H04L 63/08 713/151 |
| 2010/0189262 | A1 * | 7/2010 | Ducharme | G06F 21/602 380/277 |
| 2010/0306530 | A1 * | 12/2010 | Johnson | G06F 21/335 713/155 |
| 2011/0252114 | A1 * | 10/2011 | Okuyama | 709/217 |
| 2012/0042361 | A1 * | 2/2012 | Wong | G06F 21/12 726/4 |
| 2012/0124642 | A1 * | 5/2012 | Lee | H04L 63/0428 726/1 |
| 2012/0252531 | A1 * | 10/2012 | King | H04L 63/062 455/558 |
| 2013/0125196 | A1 * | 5/2013 | Shapiro | G06F 21/604 726/1 |

FOREIGN PATENT DOCUMENTS

| | | |
|---|---|---|
| WO | 2004/049137 A2 | 6/2004 |
| WO | 2008/089276 A2 | 7/2008 |

OTHER PUBLICATIONS

The Open Group: Technical Standard, Common Security: CDSA and CSSM, Version 2 (with Corrigenda), dated May 1, 2000, pp. 1-46, and 123-128.

International Search Report dated Feb. 2, 2011 from International Application No. PCT/GB2010/051034.

Search Report dated Sep. 28, 2009 from GB Application No. 0910765.7.

Search Report dated Dec. 10, 2009 from GB Application No. 0910765.7.

* cited by examiner

METHOD AND SYSTEM FOR PROVISION OF CRYPTOGRAPHIC SERVICES

CROSS-REFERENCE TO RELATED APPLICATIONS

The present application is a U.S. National Stage of International Application No. PCT/GB2010/051034, filed 22 Jun. 2010, which claims priority to Great Britain Patent Application No. 0910765.7, filed 22 Jun. 2009, the contents of which are hereby incorporated by reference in their entirety.

FIELD OF THE INVENTION

The present invention relates to a cryptographic service system and, in particular, to a centralised cryptographic service system.

BACKGROUND OF THE INVENTION

The provision of efficient and effective cryptography relies on close integration of application program interfaces (APIs), cryptographic service providers (CSPs) and key management.

However, implementations of hardware-based cryptography normally required bespoke vendor APIs to support applications. Key management functionality is also normally vendor specific. Accordingly, it is not unusual for a large enterprise or organization to have an encryption system that utilises several separate key management systems that do not interoperate without manual key management operations taking place.

It is worth noting that a number of standards (de facto and Standards Bodies) have been developed, but they deal with specific instances of cryptography, business sectors or products. Some of these standards are listed in Table 1 below.

With any of the APIs listed in Table 1, there is a problem of vendor implementation and vendor lock-in, coupled with reluctance of vendors to build solutions that support high levels of integration between other vendor's products and services. This gives rise to the following issues:

1. currently available cryptographic APIs that provide an interface to a cryptographic service require a number of pre-determined values to be defined before an API call is made, these pre-determined values including key values/sizes, cryptographic algorithms, modes of operation, padding schemes, and additional values (initialization vectors, etc).
2. if one were to standardize on a specific vendor, then either the bespoke APIs or Key management implementations of the vendor would need to be integrated into all relevant applications;
3. change of vendor requires a change to these applications;
4. reliance on a particular provider.

TABLE 1

| Standard | Area | Defining body |
|---|---|---|
| PKCS#1-16 | Various uses of RSA based Asymmetric based cryptography | RSA Labs |
| X 509 | Exchange and use of Asymmetric keys | ANSI |
| MSCAPI | Cryptographic support for Microsoft applications | Microsoft |
| BSAFE | Cryptographic toolkits providers | RSA |
| Control Vectors | Key Management | IBM |
| LMK Variants | Key Management | Thales |
| ACL | Key Management | nCipher |
| GSS-API | API Framework | IETF |
| X9.24 pt1/2 | Key Management Banking | ANSI |

It is possible for applications to adopt certain standards (e.g. cryptographic token interface standard PKCS#11) to try to de-couple vendor specific Application API implementations.

However, key management and cryptographic control mechanisms that are required to provide confidentiality, integrity and authentication to data within applications are currently embedded in the application, which makes changes and alterations difficult and costly to implement. Therefore, even if the application API is decoupled in the case of PKCS#11, there is still a reliance on the vendor's implementation and key management solution.

Also wholesale adoption of general encryption APIs such as PKCS#11 do not allow for deployment of application-specific cryptographic mechanisms e.g. for the banking sector, PIN block translation, card verification value, CVV generation, etc.

Another primary concern is the control over the usage of the cryptographic function. The cryptographic function should be available to entitled users only. If it is not possible to distinguish between an attacker and an entitled user, then the strongest cryptographic algorithm is rendered useless. Additionally, the scenario in which the cryptographic function can be used by an entitled user needs to be controlled. For example, it may be possible that two users, Alice and Bob, are both entitled users of the cryptographic functionality, but the security model may require that Alice can only encrypt data to Bob and Bob can only decrypt data from Alice. Without additional controls, it would be possible for both Alice and Bob to perform both encryption and decryption on data in either direction due to the nature of symmetric algorithms.

Accordingly, it is desirable to provide a flexible approach to defining the cryptographic access and control mechanisms required by applications to protect sensitive key material and data.

Statement of the Invention

According to one aspect of the present invention, there is provided an encryption service system. The encryption service system comprises an API for receiving requests from one or more calling applications. Each request comprises information identifying the functions (e.g. encryption, decryption, signature verification, MACing, etc.) to be performed on data to be processed and information identifying the origin and target of the data. The encryption service system further comprises a cryptographic server for processing the requests and determining, for each request, an encryption policy to be applied.

According to another aspect of the present invention, there is provided a method of providing encryption service. The method comprises a step of receiving, via an API, requests from one or more calling applications, each request comprising information identifying the functions (e.g. encryption, decryption, signature verification, MACing, etc.) to be performed on data to be processed and information identifying the origin and target of the data. The method further comprises processing, at a cryptographic server, the requests and determining, at the cryptographic server, for each request, an encryption policy to be applied.

BRIEF DESCRIPTION OF THE DRAWINGS

There now follows, by way of example only, a detailed description of embodiments of the present invention, with references to the figures identified below.

DETAILED DESCRIPTION OF THE EMBODIMENTS

Figure 1:
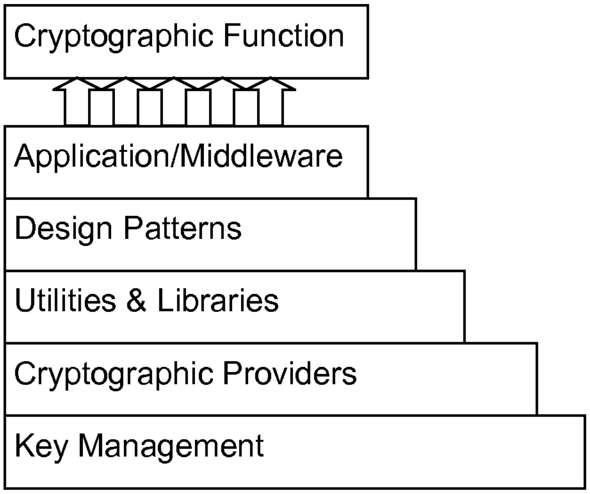
FIG. 1 is a diagram showing the layered structure of a cryptographic service system according to an embodiment of the present invention.

In order to provide a vendor agnostic cryptographic mechanism, a holistic solution that covers all the aspects of the use of cryptography in a layered approach, shown in FIG. 1, is proposed. The use of a layered approach with defined interfaces allows a system to be developed that can accommodate change. Some of the layers are concrete implementations of services while others are interface specifications and architectures.

The key management component layer provides a single integrated and automated key management solution allowing the provision of key material to the cryptographic service providers. The key management component is an automated, hardware agnostic, standards based key management infrastructure and is capable of:

- managing keys according to a predefined policy;
- generating and distributing keys from a central site;
- integrating and providing support for cryptographic services by the key management infrastructure for both internal and external use;
- supporting all key types (symmetric/asymmetric);
- moving the key management operations role from one of manual processing to one of monitoring of automated systems.

The Cryptographic Providers layer is based on a stable, managed and configurable set of hardware and software components. The cryptographic providers layers is hardware vendor agnostic and provides:

- operation and usage of a provider governed by policy;
- communication via defined APIs to all the supporting services e.g. Client API, Key Server (KS), credential management, audit;
- modular cryptographic services and utilities implemented in hardware and/or software;
- a scalable solution;
- simple deployment and management of hardware and software based cryptographic devices, The cryptographic providers layer supports:

- multiple instances of applications using the Client API;
- multiple instances of HSM (hardware security module) devices from a number of vendors via an industry standard API;
- multiple instances of HSM devices having bespoke functionality to meet specific user requirements e.g. UDX for IBM scripts/SEE for nCipher.

The Utilities and Libraries layer provides a consistent and secure approach to the implementation of cryptographic mechanisms. The utilities and libraries layer comprises tested integration code (such as JVM software packages), modules that enforce/comply with required standards and best practice, and modules that provide required cryptographic functions e.g. Secure PIN printing, Chip and PIN scripting.

Annex I lists common query language (CQL) commands that may be included in the libraries.

The Design Patterns layer provides applications with a known and quantifiable security model, covering authentication/authorisation schema (to include tokens, smart cards etc), protection of data (at rest, data in transit etc), and key management (Key Lifecycle, the migration of data during key change etc.).

The Application/Middleware layer interfaces via a defined API to a cryptographic service provider, such that an API caller (e.g. an application) is able to use a range of credentials to authenticate to the cryptographic service provider and does not need to specify the key material/label used to perform the required cryptographic function. The Application/Middleware layer supports:

- cryptography used at application level, comprising APIs and abstraction of key management and authentication control into a policy driven framework; and
- cryptography used at infrastructure level, providing cryptographic services to support the security and integrity of the IT infrastructure.

Utilising the layered structure, the embodiment deploys a centralised cryptographic service system to provide users with consistent user security.

By employing a high level API that separates the calling applications and any details of the encryption mechanism, such as key management and cryptographic providers, the centralised cryptographic service system allows calling applications to request a cryptographic function by using a simple sentence construct with information regarding the origin, the target and what needs to be done with the data. The specific encryption policy that needs to be applied can be determined by the cryptographic provider layer under the API.

By defining the key management and cryptographic controls within a policy that is then implemented and enforced by a separate entity external to the application, the embodiment allows the policy to be applied on a per cryptographic call basis. This allows a fine-grained flexible control system to be deployed without the need to alter application code or require the wholesale migration of encrypted data from one key or mechanism/algorithm to another.

If the determined policy specifies that the data is managed, then the encrypted data block, or cryptogram, contains the information required to decrypt the data; for example, the encryption key identity and cryptographic mechanism are wrapped with all the data processed, in order to decouple the key management and cryptographic controls from the application. By including the key management and cryptographic mechanisms within the cipher text, the embodiment allows any alteration to the key management and cryptographic mechanisms to be implemented in the next API call without requiring a change to the application. By binding the key identifier and cryptographic mechanism to the cipher text, the application can recover the clear text without the application knowing the key mechanism or cryptographic mechanism used to protect the data.

If the determined policy specifies that the data is unmanaged, then the cryptogram contains only the encrypted data, and does not include sufficient information to decrypt the data. The receiving application will need to have prior knowledge of how the data was encrypted, or the information on how to perform the decryption operation will be included in the policy for that application. As an example, the policy would need to specify an explicit key and cryptographic mechanism to use, as opposed to using the metadata that would be contained in a managed data construct. The use of unmanaged data allows the exchange of data with systems that do not implement a managed approach.

The use of policy-based cryptography can also be extended to a Key Server (KS). The KS supports distribution of asymmetric/symmetric key material as defined by a key usage policy to disparate endpoints based on strong authentication of the API caller (e.g. an application) and enrolment of a Cryptographic Server (CS). By supporting strong authentication of the application and CS, key material can be distributed to third parties should the need arise.

Since calling of the low level cryptographic APIs is decoupled from the API, it is possible to use a variety of hardware and software products from different vendors as well as increasing the utilisation of the existing devices. By managing the low level cryptographic services in this way, a cryptographic service may be provided, which can be supplied on a per-use basis (i.e. a "crypto-on-demand" service).

Figure 2:
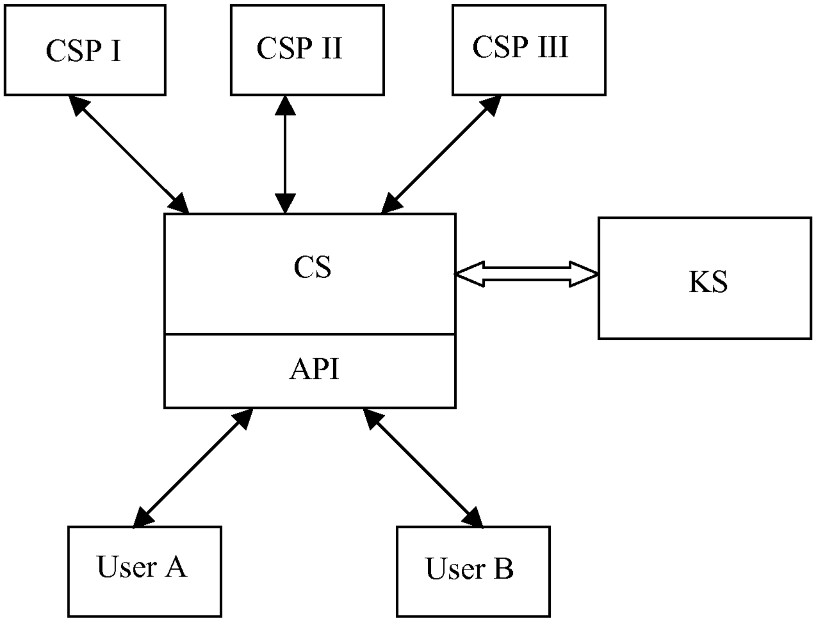
FIG. 2 illustrates the operation of the cryptographic service system according to the embodiment.

FIG. 2 illustrates the operation of the cryptographic service system according to the embodiment.

One or more users (e.g. applications) may call a CS via an API to request cryptographic services. The CS, upon receiving the call, checks the users' identity (e.g. ID token). If the CS is satisfied that the users' identity is valid, it then processes the request(s) by determining the appropriate encryption policy and requesting the appropriate cryptographic service provider(s) CSP to perform the specific cryptographic services requested. When processing the requests, the CS may request appropriate keys from the Key Server (KS).

The users may be connected to the CS over a network, such as a local area network (LAN), a wide area network (WAN) or the Internet. The CS may be connected to the KS over a network, such as a local area network (LAN), a wide area network (WAN) or the Internet.

Further implementation details of several aspects of the centralised cryptographic service mechanism will be discussed below.

1. Client API

Figure 3:
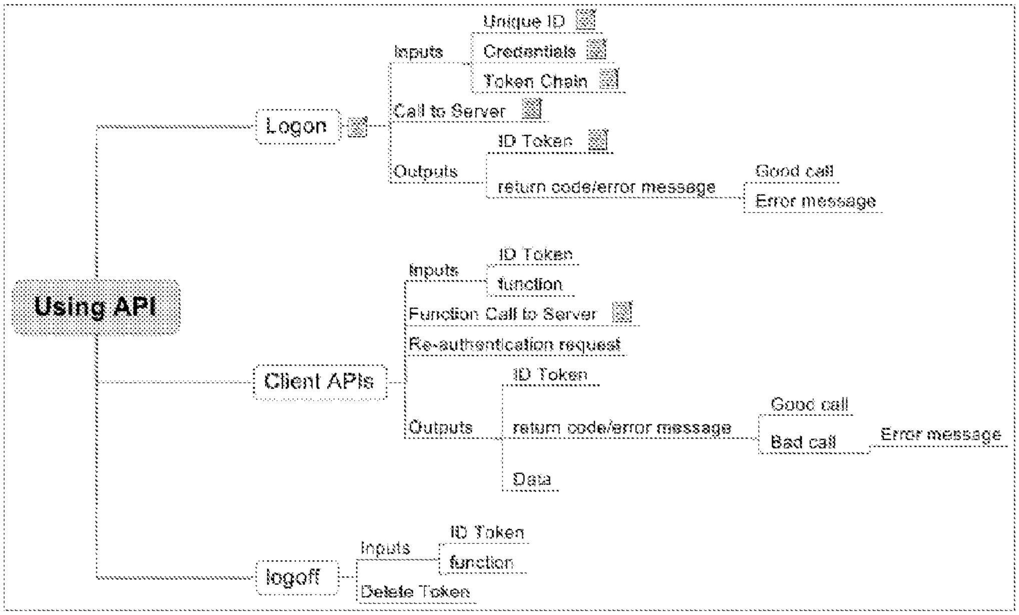
FIG. 3 is diagram showing the components and functions of a client API according to the embodiment.

FIG. 3 illustrates an example of a client API.

1.1 Logon

An application is required to logon to each instance of a CS it wishes to communicate with, for example by supplying appropriate credentials. The CS calculates and returns an ID token. The API client appends the returned ID token to an ID token chain which is required to be passed in with each Client API call. Upon receiving a call, the CS checks the ID token chain for an instance of a token it generated. If a valid token is found then the command is processed, otherwise the call is rejected.

In order to support applications that are time critical the logon has two forms.

Normal—For a Normal logon the server validates the credentials supplied, calculates and returns the ID token.

Pre-fetch—For a Pre-fetch logon the server performs the same functions as the normal logon but with an additional step of loading a defined set of keys into the local key store of the cryptographic service provider before returning. This is used to load keys that will be used frequently within the application.

An example of pre-fetch is the fetch of a symmetric key to MAC data before onward transmission of the data.

The keys that are loaded as part of pre-fetch are grouped and flagged by the ID Token. When the ID token is deleted the keys are removed from the local key store.

1.1.1 Inputs 1.1.1.1 Unique ID

The unique ID is an indicator that is used to identify the application. This unique ID may be used by the policy engine within the CS to determine the rights afforded to the application.

1.1.1.2 Credentials

The credentials are used to prove ownership of the unique ID for the application. The credentials provided may contain an indicator identifying the credential type being supplied. The credentials may be any of the following, by way of non-limiting example:

user name and password (static)

digital signature challenge response

One Time Password/Code

Support for SAML V2

1.1.1.3 Token Chain

This is the Token Chain to which the CS appends its ID token on successful authentication of the calling application.

1.1.2 Call to CS

The call/request may be wrapped using various access protocols, Simple Object Access Protocol (SOAP) for example. The request preferably includes a data authentication mechanism and is preferably sent via a confidential link e.g. HTTPS. The command is:

LOGON type FROM origin TO server WITH additional data items

The arguments are listed in Table 2 below.

TABLE 2

| Type | Origin | Target | Data |
|---|---|---|---|
| Normal | Application ID | CS | Credentials |
| Pre-fetch | Application ID | CS | Credentials and pre-fetch list |

The additional data items include credentials to support the application ID specified in the origin field and optionally any additional data to support a pre-fetch request. The content of the call includes:

for a Normal logon—the ID of the credential type being supplied and the credentials themselves; and for a Pre-fetch logon—the details above and a list of pre-fetch API calls that the requesting application has cached.

An example form of the API for elements on the Pre-fetch list is:

Pre-fetch operation FROM origin TO target WITH additional data items

The Pre-fetch is a subset of the functionality of the DO API call (see section 1.2). The pre-fetch drives the key resolution but not the actual cryptographic function.

Note that if the key definition does not support caching, then the key will not be cached and the application will be informed accordingly via response/return codes.

On successful authentication by the CS of the credentials supplied by the calling Client API, an ID token is issued to the Client API.

1.1.3 Outputs 1.1.3.1 ID Token

The ID token needs to be presented with every call made to the CS. The client is required to logon to each CS with which it wishes to communicate. Each CS returns a valid token that is appended to the client ID Token chain.

1.1.3.2 Data from CS

The CS returns to the API an output data block generated in response to the call/request, which is passed to the calling application.

1.2 Call APIs

The API should be as simple as possible for the application programmer to implement. It may be close to natural language. Ideally it should allow the cryptographic control required by the design to be expressed in the API.

The client API marshals API commands and transmits them to the central cryptographic server CS. API command confidentiality and integrity is protected using (secure sockets layer) SSL/TLS.

An example API command is:

DO operation FROM origin TO target WITH additional data items Some possible arguments are listed in Table 3 below, together with the resultant output data. The Origin is the intended sender(s) of the output data, while the Target is the intended recipient(s) of the output data.

TABLE 3

| Operation | Origin | Target | Input Data | Output Data |
|---|---|---|---|---|
| Encrypt | Application A | Application B | Clear text data | Cipher text data |
| Decrypt | Application A | Application B | Cipher text data | Clear text data |
| Wrap Data | Application A | Application B | Clear text data | Cipher text data |
| Unwrap Data | Application A | Application B | Cipher text data | Clear text data |
| MAC | Application A | Application B | Clear text data | MAC value |
| MAC Verify | Application A | Application B | Clear text/MAC data | Clear data yes/no |
| Encrypt &MAC | Application A | Application B | Clear Text data | Cipher text/MAC value |
| Decrypt & MAC verify | Application A | Application B | Cipher Text data | Clear text/Verification |
| Generate Sig. | Application A | Application B | Clear text data | Sig. data |
| Verify Sig. | Application A | Application B | Clear text/Sig. data | Verification |
| Wrap & Sign | Application A | Application B | Clear text data | Cipher text data |
| Unwrap & Verify | Application A | Application B | Cipher text data | Clear text data/verification |
| Generate CVV | Application A | BIN Range | PAN, exp, service code, CVV | Clear text data/verification value |
| Verify CVV | Application A | BIN Range | PAN, exp, service code, CVV | Clear data yes/no |
| PIN Translate | Application A | Application B | PIN Block | Cipher text data |
| PIN Generate | Application A | Customer/BIN | PAN | cipher text data |
| PIN Wrap | Application A | Application B | PIN Block | Cipher text data |
| PIN Unwrap | Application A | Application B | Cipher text data | PIN Block |
| HASH | Application A | Application B | Clear text data | Hash data |

Notes:
1. Cipher text data contains a mixture of cipher text and clear text data.
2. If the target and the destination are the same, this signifies data encryption for storage by the application (Data at rest).
3. Strong typing of the data items is supported to prevent the misuse of an operation.
4. The Origin to Target can support a, 1:1, 1:n or n:1 relationship.

The ID token is returned by the CS to the calling Client API if the following checks are successful:

Is the Application ID known to the CS?

Is the Unique ID known by the remote?

Are the credentials supplied by the Client API valid?

If any of the above checks are not successful, an error message is issued.

The ID token contains a reference to the ID and any policy controlling/defining the application, an attribute of the calling Client API machine (serial number etc), an expiry date/time for the token, a mechanism to prevent replay of the token, and the issuing CS ID.

The data elements above are encrypted using a key unique to the server. This key is delivered in the Base Key Set. The ID token additionally contains a mechanism that allows the server to cryptographically validate tokens issued by it (e.g. HMAC) and additional fields (e.g. pre-fetch key list).

If the API call made is via an API abstraction, this abstraction is responsible for rendering the calling command down to a single string. A typical string form is:

DO fileencrypt FROM ME TO storage WITH DATA 3F5C381A73BF9E93210

The API abstraction may maintain state, for instance to automatically include command capabilities retrieved from the logon command, or to automatically fill in other inputs based on contextual or stored information.

The string input is passed to a command dispatcher, which is a single command addition to the Portal API, to support passing of data to the command engine. The Portal command marshalling then does the final conversion to a network transmission suitable representation and transmits the data to the server via an SSL/TLS link.

1.2.1 Credential Renewal

In order to reduce exposure due to theft of ID tokens, an expiry parameter is included within the structure of each ID Token. When the server is presented with an expired token, it rejects the request.

To allow processing to continue beyond the lifetime of the token, a re-authentication mechanism is required. Due to the requirement for an ID token be presented with each Client API call, a Client API wishing to request cryptographic service is obliged to perform a logon to obtain a new ID Token. This inevitably creates a delay in processing, which would be exacerbated if multiple instances of the Client API were in operation. Therefore the Client API is required to monitor the expiry period of the ID Token and request a renewal of the token within a pre-defined window e.g. 10 min of expiry. The re-authentication requires the Client to present the credentials and the current ID token. If the user credentials are still valid and the ID token is within its renewal period, then the client will be passed an updated token (i.e. the expiry period will be reset).

An example Client API to extend lifetime of an ID Token is:

EXTEND ID Token FROM origin TO server WITH additional data items

The arguments are listed in Table 4 below.

TABLE 4

| ID Token | Origin | Target | Data |
| --- | --- | --- | --- |
| ID token from Log on | Application ID | CS | Credentials |

1.3 Logoff

In order to support a clean shutdown, the application is required to issue a logoff command to all the servers that it has communicated with in order to clear any cached keys from the CS local key store.

As each server processes the received logoff request, it removes its ID token from the ID token chain passed by the Client API and returns the modified ID token chain.

2. Permission Rules

Based on the parameters defined in the Client API call (Type, Origin, Target), it is possible for the CS to check whether the Client API is authorised to perform the requested function. The format of the command is:

AUTHENTICATE function FROM origin TO target USE mechanism

Where ambiguity exists, the Data type may be used to finalize key selection. Since the API requires strong data typing, the data type can be identified. For example, if the data is identified as a PIN block and the function is a decryption function, the function would not be authorized. However, if the data is identified as encrypted data, a decryption function would be authorized.

If the Client API is authorised to perform the function it is requesting, it should be possible for calls that operate on clear text data to map a key request to the Client API based on the parameters defined in the client API call (Function, Origin, Target).

For API calls that operate on cipher text, the key label can be extracted and validated against the rule (see Section 3 Data Structures). The format of the command is:

FOR function FROM origin TO target USE key label

The Client API requests cipher text to be constructed from clear text or a verification object to be created. The key label specified in the rule is used to form the GET Key request to the KS.

For requests that de-construct cipher text back to plaintext or verify a verification object, the Key Unique Identifier (key UID) needs to be parsed to obtain the Key Label before the rule can be validated. On successful validation, the key UID is used to form the GET Key request.

2.1 Format Rules

In order to simplify the Client API, additional processing rules are defined to complete the required parameters for a cryptographic call. The format of the command is:

EXPLICIT function FROM origin TO target USE parameter

DEFAULT function USE parameter

Examples of the function and the parameter are listed in Table 5 below.

TABLE 5

| Function | Parameter |
| --- | --- |
| Symmetric Padding | CBC, CUSP, IPS, X923 |
| Asymmetric Padding | Zero Pad PKA92 PKCS#1.2 |
| HASH | SHA 256 |
| PIN Block Format | ISO-0 |
| PIN Size | 4 |

2.2 Authentication System

The CS supports authentication modules which interact via a standard API with the CS and are integrated with it. The CS does not store any user credentials itself. Preferably, each user uses no more than one authentication method at a time, that is, for each distinct user name there is exactly one authentication module instance to which the authentication request is always routed.

The authentication modules answer requests to authenticate the identity of a user and return a yes/no answer, together with limited data about that user when available. A typical authentication module is a simple wrapper that implements a remote calling protocol to a fully-fledged authentication system.

The authentication module API may support multi-message authentication (particularly challenge and response), rather than just username and password. However, in a simple implementation, only username and password are needed.

For stateful authentication methods such as SMS messages or matrix cards, it is the responsibility of the authentication system, not the CS, to maintain state. The authentication module cannot offload state to the CS.

User names supplied to the authentication modules by the CS contain a prefix that specifies the authentication module that is to validate the user. User names can be structured to allow selection of multiple different instances of the same authentication module. For instance there might be two Active Directories accessed, using LDAP\DIR1 and LDAP\DIR2 as prefixes.

It is the responsibility of each authentication module to map the input user name from the CS (e.g. LDAP\DIR1\HomerSimpson) to the precise string name that makes sense in their authentication system.

It is possible to use the authentication capability of the CS in several ways for maintaining a long-term relationship between a user and the CS.

The authentication system supports three authentication methods: Local Authentication, Active Directory LDAP, and Remote Authentication Dial In User Service (RADIUS).

2.2.1 Local Authentication

A "local authentication" module can be implemented to authenticate users by hashing their password and comparing it with a file of userIDs/password hashes stored on disk. This module may be used by applications that do not take on individual user identity, calling the CS for cryptographic services. Preferably, the hashes are heavily salted to protect against dictionary attacks. The hash algorithm may be selected so that there is no existing rainbow table easily available. Ideally, the user/pass storage file is mildly obfuscated on disk.

2.2.2 LDAP

An LDAP authentication module can be implemented to allow standard password authentication of users to be made, for example via Active Directory. This module can log on to an active directory using an "authentication service" user ID, and from there it can be granted access to make repeated verification requests against different users. The Active Directory can look up these users in an LDAP, which is part of the Active Directory service. The Active Directory authentication module can retrieve a list of groups of which the specified user is a member and return this as a result of the authentication.

2.3 Smartcard Authentication for Operators

Operators accessing an operator interface need to authenticate to the server using smartcards containing private keys. The back-end system that authenticates these should use the same API as the other authentication modules use to verify the logon from each user. Operators may also authenticate to the server using smartcard authentication via the client API, although this is not essential.

2.4 Authentication and Tokens

The CS implements a simple token system that generates a "ticket" or token after a successful logon, which must be resubmitted for each additional command that requires authorisation. The tokens are MACed with a "credentials key" which is stored in software by the CS and on disk in a mildly obfuscated file.

Once a token has been verified it can be cached to reduce time taken to verify it. When a token is issued by a CS, it is automatically registered in the cache.

Each token contains the following data: Username, Time-of-Logon, Lifespan of token, Groups of which user is a member.

The CS checks the tokens provided with each command. The check includes at least cryptographic integrity and expiry of the token date.

3. Data Structures 3.1 Cipher Data

The produced Cipher Data structures are preferably self-defining (i.e. managed) such that they contain all the necessary information to allow the correct reciprocal operation to be performed. For example, the command DO encrypt FROM Application A TO Application B WITH clear text data returns an object which contained the following information:

Message Format Identifier

Unique Identifier of the key used to encrypt the data (the algorithm is bound to the key)

Padding Mechanism used

Encrypted data

Authentication

For the command

DO decrypt FROM Application A TO Application B WITH cipher text data, the cipher data contains the required information to determine the key required and the algorithms and mechanisms (e.g. padding) to be used to produce the corresponding clear text.

3.2 Key Labels

A key label is a unique identifier for a set of key metadata. The key metadata is used to define:

the key life cycle the algorithm to be used the current active instance of the key to be used.

Key labels may be used to define the explicit instance of the Key to be used (i.e. the current active instance) and the cryptographic algorithm to be used.

3.3 Key Unique Identifier (Key UID)

A key UID is used to identify a unique instance of a key built using the metadata associated with a Key Label. The Key UID may be formed by appending the Key Label used to define the key to a string to insure that the instance is unique. A delimiter value may be used to separate the key label portion from the remainder of the string.

A Key Instance has defined within itself:

the key life cycle dates the algorithm to be used key usage.

A key UID may be used to define the explicit controls for the key instance used.

4. Key Management 4.1 The Key Management Interface

The CS is able to request keys from the Key Server (KS). In return, the CS may receive an encrypted key and associated metadata, where the key can be enciphered in a form that can be handled by the receiving HSM.

The CS receives information about which key is required from the API call, and from this it produces a KeyLocator containing all the information required to look up the correct key. The KeyLocator is passed to the KS, which resolves it to a key.

The CS is not concerned with the resolution process. The KS then returns a KeyObject which contains the key data itself, and all the required metadata. Within this KeyObject the key itself is returned in encrypted form, encrypted under a Key Encryption Key (KEK) that is provided in the metadata, but also may already be held by the HSM.

The KS is able to return via the API two sorts of keys: keys encrypted under KEKs, which need to be unwrapped, and keys encrypted as HSM-ready tokens, which can be passed straight to an HSM.

In event of an error, the KS must return an error data structure, which explains the problem.

All of the data structures specified for the key management interface have proper version information.

The CS can open multiple simultaneous connections to the KS in order to parallelise key requests. A single CS may have at least 10 requests running in parallel at any time, possibly many more under high load.

4.1.1 Key Locators

The KeyLocator consists of an unordered set of attribute/value pairs where all values are strings. The API between the CS and the KS may be encoded in XML. The USER, FUNCTION and BASEFUNCTION fields are always present. However, depending on the command, there may or may not be FROM, TO, UID and ROLE fields. The fields are listed in Table 6 below.

TABLE 6

| Fields | Notes |
|---|---|
| User | contains the fully qualified username of the logged on user who is requesting the function. E.g. LDAP\DIR1\JoeSmith |

TABLE 6-continued

| Fields | Notes |
|---|---|
| Function | contains the function name for which the key is requested. If the command uses a Function Alias, then it is the alias which is included here. An example is fileencrypt |
| BaseFunction | contains the name of the base function underlying the function alias, in case this is useful to the KS in resolving which key is required. For instance, if the alias is fileencrypt, the base function will still be ENCRYPT |
| From | the from field contains the resolved string representing the "from" field in the command, which is simply a string of characters containing an identifier. Examples are LDAP\DIR1\OnlineBanking and swift and database. Note that the first example happens to be a user name, but it is just to be treated as an identifier which has no internal structure |
| To | the to field contains the resolved string representing the "to" field in the command, which is simply a string of characters containing an identifier. The semantics is exactly the same as the FROM field |
| UID | the UID field contains a unique identifier string which the CS expects will be unique to just one key within the key management system (the cluster of KM boxes, potentially) |
| Role | the ROLE field contains a string which specifies a particular purpose or "role" for the key within the function which is to be executed. The ROLE field is intended only to be used if a function requires more than one key to be looked up |

An example key locator is:

```
<KeyLocator>
<User>LDAP\DIR1\MikeSmith</User>
<Function>fileencrypt</Function>
<BaseFunction>ENCRYPT</BaseFunction>
<From>LDAP\DIR1\MikeSmith</From>
<To>storage</To>
</KeyLocator>
```

4.1.2 Key Objects

The KeyObject data structure which is returned contains the following data:

TABLE 7

| Fields | Notes |
|---|---|
| KeyReturnMethod | specifies how the key will be returned to the CS. There are two options: the first is KEKEncrypted which states that the encrypted key returned is suitable for decryption using a provided KEK. The second option is KeyToken which states that the encrypted key returned is already in a format suitable for passing to the HSM, so can be sent directly in. This attribute is always present. |
| EncryptedKey | contains the desired key, encrypted under a key encryption key (KEK) of the KM server's choice. Present if the KEKEncrypted option is chosen for KeyReturnMethod |
| KeyToken | contains the desired key, returned in a form directly ready for the HSM to use. In HSM terminology, this is often called "key token" or a "blob". This field is present if the KeyToken option is chosen for KeyReturnMethod |
| UID | contains the unique identifier string for the key that has been returned. It is entirely up to the KS what format this string has. Always present. |
| KEKID | contains a string which identifies the KEK to be used to decrypt the EncryptedKey when it is imported into the HSM. This string could contain a numeric ID, or characters, or a hash value, it is up to the KS. Only present in KEKEncrypted mode. |
| CacheDuration | this contains the duration in seconds for which the key should remain cached in the CS cache, and within the HSM. If set to zero, the CS will not cache the key at all, and it will need to make a call to the KS every time it repeats the command. Always present. |
| KEK | This contains the definition of an actual Key Encryption Key, which may need to be provided as not all are known in advance to the KS. It contains within the KEKID and EncryptedKEK subfields. The correct KEK to use to decrypt is always returned by the call, but the CS may already detect that it has the KEK with this ID, so will probably not need to load it into the HSM. Only present if the KEKEncrypted option is chosen. |

Example Key Object:

```
<KeyObject>
<KeyReturnMethod>KEKEncrypted</KeyReturnMethod>
<EncryptedKey>4EB190C9A2FA169CD2FD8867D50D2DFE
</EncryptedKey>
<UID>adc83b19e793491b1c6ea0fd8b46cd9f32e592fc</UID>
<KEKID>212</KEKID>
<CacheDuration>3600</CacheDuration>
<KEK>
  <KEKID>212</KEKID>
<EncryptedKEK>166B40B44ABA4BD606E7EA22CE92708F
</EncryptedKEK>
```

-continued

```
</KEK>
</KeyObject>
```

Annex II lists several worked examples of key locators, shown in both pseudo-code and in XML notation, together with the commands that produced them, and the resulting key objects.

4.2 Key Management System Logic

The KS needs to:

1. Map the key locator attributes to attributes held within the internal key metadata representation native to the KS. For instance, a user from the key locator might map to a field called Creator in the KS.
2. Perform conditional mappings of some fields based on the values of others. This deals with the situation where the FROM and TO keylocator/command fields might map to different attributes depending on the overall type of the key. For example, if the key is a communications encryption key, there might be custom attributes called "endpoints", and the KS needs to map both FROM and TO to endpoints. Alternatively, if the key is a signing key, the KS might want to map the FROM field to a Subject Name attribute stored within an associated certificate accompanying the signing key.
3. Put in additional criteria that are dependent on information the KS has, e.g. the current date and time.
4. Create a database search query once all the fields have been mapped through, which aims to retrieve a particular key.
5. Examine the key metadata and determine (if it has an owner) whether the user accessing the CS is entitled to use this key.
6. Take the actual key value from the database (however it is stored), and translate it to encryption under an appropriate Key Encryption Key.
7. Create a Key Object containing the returned key and associated metadata.

4.3 Key Management Requests

Figure 4:
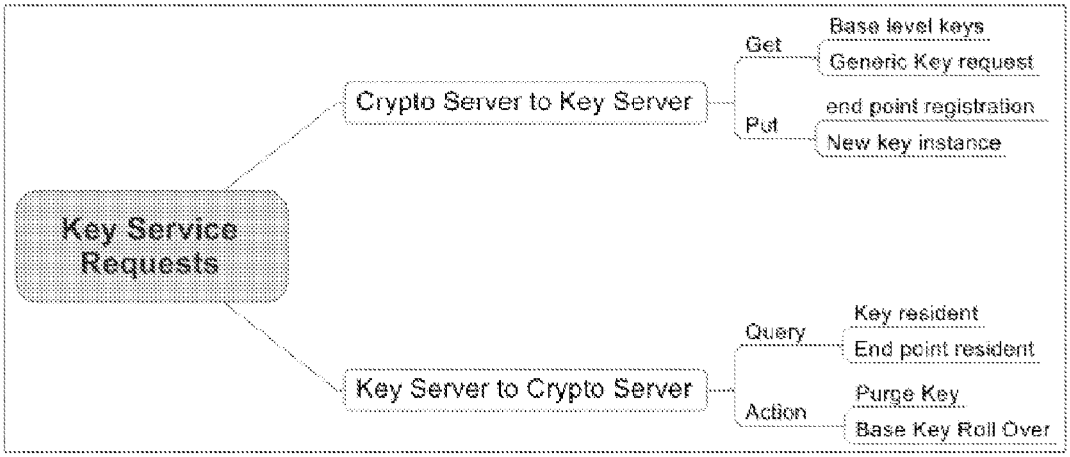
FIG. 4 illustrates the functioning of key management requests in the embodiment.

The commands for Key Management Requests are illustrated in FIG. 4. The commands include commands for requests from KS to CS and commands for requests from CS to KS.

4.3.1 Key Server to Crypto Server

Commands for requests from KS to CS include Query and Action commands.

The Query commands include a Key residency command and an End Point residency command.

Key residency—the function of this command is to allow the KS to test if a specific key instance is being used or is resident in the cache on a given CS.

End Point residency—the function of this command is to allow the KS to test if a specific crypto engine is still resident within a CS.

The Action commands include a Purge Key command and a Base Key Rollover command:

Purge Key—the function of this command is to allow the KS to purge a specified instance of a key from the CS if it is resident.

Base Key Rollover—the function of this command is to allow the KS to force the change of a specific instance of a base key. (Note: to change a CS unique key would require the crypto engine to be re-enrolled.)

4.3.2 Crypto Server to Key Server

Commands for requests from CS to KS include GET and PUT commands.

In order to request the correct key from the KS, an API call is to be performed by a GET command.

GET key label/Key UID FOR function FROM origin TO target

Based on the parameters defined in the GET API call (Key label, Key UID) the KS either determines the valid key instance to be used or returns the explicit key requested.

An example GET API call (using parameter Key label) is:

GET xyz123 FOR encrypt FROM application A TO application B

The GET API call is passed to the KS where it can be used to retrieve a specific instance of Key Metadata. The Key Metadata is used to define:

the key life cycle the algorithm to be used the current active instance of the key to be used.

key usage key residency, i.e. hardware or software key domain, i.e. production or test keys This command defines the explicit instance of the Key to be used (i.e. the current active instance) and the cryptographic algorithm to be used. This information is returned in the response.

An example GET API call (using parameter Key UID) is:

GET xyz123.nnnn FOR encrypt FROM application A TO application B

The GET API call is passed to the KS where it can be used to retrieve a specific instance of a Key based on the key's Unique ID. The Key Instance has defined within it:

The key life cycle dates

The algorithm to be used

Key usage

Key residency

Key domain

This command can be used to define the explicit controls for the use of this key instance used.

In order to load a key generated by a Client API request to the KS, a PUT command may be used:

PUT key label/Key UID FOR function FROM origin TO target

Based on the parameters defined in the PUT API call (Key label, Key UID) the KS either determines the valid key metadata instance to be used or returns an error.

An example PUT command (using parameter Key label) is:

PUT xyz123 FOR encrypt FROM application A TO application B

The PUT API call is passed to the KS where it is used to add a key instance based on a specific instance of Key Metadata. The Key Metadata is used to define:

The key life cycle dates

The algorithm to be used

Key usage.

Key residency

Key domain

This command defines the explicit instance of the Key and the cryptographic algorithm to be used.

4.4 Key Matrix

The acceptable domains in which a key can reside in are listed in Table 8 below.

TABLE 8

| | Domain | | | | |
|---|---|---|---|---|---|
| Residency | Hardware | Software | Live | Test | Cache |
| Hardware | | No | Yes | Yes | Yes |
| Software | No | | Yes | Yes | Yes |
| Live | Yes | Yes | | No | Yes |
| Test | Yes | Yes | No | | Yes |
| Cache | Yes | Yes | Yes | Yes | |

4.4.1 Key Segregation

Key segregation is maintained from the highest level of the key hierarchy, i.e. under a separate set of Storage Master Keys.

The underlying HSMs provide cryptographic key typing, which ensures keys used for different purposes are stored separately. Depending on the HSM architecture there may or may not be a hierarchy (e.g. no hierarchy is present on a PKCS#11 HSM, but there is on a Thales HSM8000), but either way there is strong key separation. The CS does not provide this functionality directly. Separation is ensured by the underlying HSMs.

Key separation is provided by the underlying HSM, and the CS has to be reliant on the HSM functionality available. Where separate storage master keys are available (e.g. HSM8000 has 16 keypairs) these are used. In other circumstances separation is maintained, but using mechanisms such as key variants.

The CS can use policy management to segregate keys and therefore keys intended for one domain cannot be used for the other, but the primary protection mechanism is to ensure that both live and test KEKs are not loaded into the same HSM at the same time.

The CS stores a unique key for each crypto engine (HSMs or SSMs) within the KS. The unique key may be used to perform a cryptographic function (i.e. a hash or key verification value, KCV) on a verifiable unique identification string of the CSP (e.g. Serial Number for HSMs, Hash of Code for SSMs). The unique key for each crypto engine can be distributed to the KS. The KS can verify the unique key for each crypto engine to complete enrolment.

4.4.2 Key Export

Key export shall be performed under dual control (as a minimum) to external entities. A key export feature may not be necessary in the CS, as the KS to which it interfaces may have this functionality as standard, and within the KS UI is the best place for it.

4.4.3 Key Distribution

The CS is responsible for distributing keys as requested by the KS, but the KS takes ultimate responsibility for the destination of KEKs as they are manually loaded/confirmed into the devices. In normal operation, a unique KEK is used for each CSP and it is not possible to move KEKs from CSP to CSP.

The first step in the key distribution process is the registration of an end point Crypto Engine. This is followed by the distribution of a base key set to allow Cryptographic Engine to process keys supplied with cryptographic function requests. The key distribution supports multiple instances to allow segregation at the base key level.

The CS uses hashes of key tokens internally as a unique ID for that key, and can also maintain KCVs or public key hashes as appropriate.

A cryptographically secure mechanism to identify HSMs during enrolment is provided, and the CS mediates the exchange of keys between the KS and the introduced HSM. There can then be a direct manual confirmation step where custodians visit the HSM console and KS UI, and confirm the cryptographic material. A unique key is set up between the KS and each CSP in every case.

In the case of HSMs supporting public key crypto, the CS forwards the public key to the KS, the operator UI displays the hash, and the hash is checked out-of-band.

In the case of symmetric only HSMs, the entire exchange is out-of-band for the CS. The operator UI supports dual control for modification of critical settings and undertaking key loading/HSM enrolment activities. Note however that security exposure can only arise from enrolling the wrong HSM to the KS, and not to the CS (as the KS is the one who must trust the KEK).

4.4.3.1 Crypto Engine Enrolment (See Also: Section 4.3.2.2)

The process that a Crypto engine under goes for induction into the CS/KS is called Crypto engine enrolment. Enrolment of a Crypto engine or CSP shall require at least dual operator control. i.e. cryptographic administrators.

General principle of Crypto engine enrolment includes:

- Dual control is required to perform the enrolment of a Crypto engine.
- The Crypto engine is required to generate a unique key and a key verification value (KCV or Fingerprint).
- The unique key is to be used to perform a cryptographic function on a verifiable unique identification string that is bound to the Crypto Engine e.g. Serial Number/code fingerprint.
- The unique key and the cryptographically bound Crypto Engine ID are to be distributed to the KS.
- The unique key and Crypto Engine IDs are to be verified and enrolled into the KS.

Hardware Crypto Engine Enrolment includes enrolment of RSA capable devices (hardware) and enrolment of symmetric only devices (hardware).

Enrolment of RSA capable devices include the following steps:

- The KS operator(s) logging on to the CS application to perform the HSM enrolment;
- Generating a RSA Public/Private Key pair;
- Generating a fingerprint for the RSA key Pair and displaying it;
- Using the key to sign a unique identifier of the HSM (e.g. serial number);
- Distributing the public key component to the KS;
- Manual authentication to verify the fingerprint of the key received by the server is the same as the key generated by the HSM, including:
  - if the key fingerprint matches the generated fingerprint;
  - if the fingerprint matches and the received public key can verify the signature on the unique identifier of the HSM;
- Enrolling the HSM in the KS; and
- Storing the verified public key and the HSM ID and using them to distribute the base keys.

Enrolment of symmetric only devices include the following steps:

- The KMT operators logging on to the CS application to perform the HSM enrolment;
- Generating a symmetric Key;

Calculating a KCV for the key;

Splitting the key into multiple key components (KCV generated for each share) and distributing a share to each logged on KMT Operator;

Using the key to generate a MAC for a unique identifier of the HSM (serial number);

The operators entering the key components to reconstruct the key;

Manual authentication to verify the KCV of the key received by the server is the same as the key generated by the HSM, including:

if the keys KCV matches the supplied KCV;

if the KCV matches and the received symmetric key can verify the MAC on the unique identifier of the HSM;

Enrolling the HSM in the KS; and

Storing the verified symmetric key and the HSM ID and using them to distribute the base keys.

Software Crypto Engine Enrolment also includes enrolment of RSA capable devices (software) and enrolment of symmetric only devices (software). Software crypto engines can be enrolled in the same way as normal HSMs.

Enrolment of RSA capable devices include the following steps:

The KMT operator(s) logging on to the CS application to perform the HSM enrolment;

Generating a RSA Public/Private Key pair;

Generating a fingerprint for the RSA key Pair and displaying it;

Using the key to sign a unique identifier of the Software implementation (e.g. hash of code);

Distributing the public key component to the KS;

Manual authentication to verify the fingerprint of the key received by the server is the same as the key generated by the software implementation, including:

if the key fingerprint matches the generated fingerprint;

if the fingerprint matches and the received public key can verify the signature on the unique identifier of the software implementation;

Enrolling the software implementation in the KS;

Storing the verified public key and the software implementation ID are stored and using them to distribute the base keys.

For symmetric only devices:

The KMT operators logging on to the CS application to perform the HSM enrolment;

Generating a symmetric key;

Calculating a KCV for the key;

Splitting the key into multiple key components (KCV generated for each share) and distributing a share to each logged on KMT Operator;

Using the key to generate a MAC for a unique identifier of the software implementation (e.g. hash of code);

The operators entering the key components to reconstruct the key;

Manual authentication to verify the KCV of the key received by the server is the same as the key generated by the software implementation, including if the keys KCV matches the supplied KCV;

if the KCV matches and the received symmetric key can verify the MAC on the unique identifier of the software implementation;

Enrolling the software implementation in the KS;

Storing the verified symmetric key and the software implementation ID are stored and using them to distribute the base keys.

Figure 5:
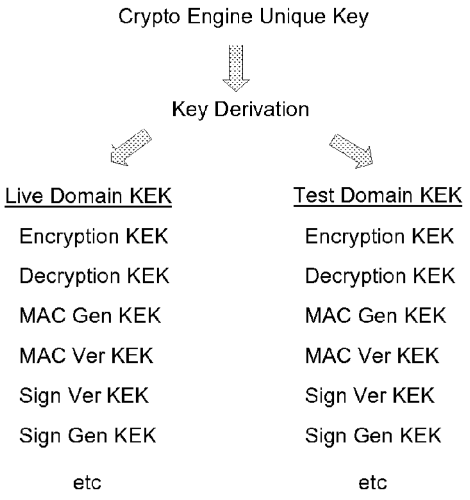
FIG. 5 illustrates the generation of various key encryption keys (KEKs) in the embodiment.

As illustrated in FIG. 5, once the Crypto Engine Unique Key is registered to the KS, it is used to generate via key derivation two Domain KEKs for Live and Test. The derivation data is distributed back to the Crypto engine under Crypto Engine Unique Key to allow the Live and Test domain keys to be recreated on the Crypto Engine.

Under each generated domain KEK the wrapping keys for the live and test domain are wrapped and distributed to the Crypto Engine. Once this has been completed the HSM is ready to accept work from the command builder.

4.4.3.2 Base Key Set

Once a Crypto engine device has been enrolled into the KS then a set of base keys needs to be distributed to the Crypto engine in order to allow it to receive key material to support cryptographic API calls. The KS is able to request that a specific instance of a base key can be changed. The base keys are distributed under the unique device key that was registered when the Crypto engine was enrolled. A key policing mechanism is utilised to provide key segregation.

Each Crypto engine is required to implement a key protection mechanism to protect the Base key set. Hardware Crypto engines use the physical protection mechanism of the device. Software Crypto engines use obfuscation techniques to protect the base key set. Note that a hardware device is not necessarily required to support the deployment of software Crypto engines. A possible modification is to have software Crypto engines detect the presence of a hardware Crypto engine and declare an affiliation to a hardware device; this would complicate the Crypto engine loading and registration process.

The keys to be distributed include Token Key, Policy/rule verification keys, Audit MACing keys, Domain wrapping keys (under the each domain there is a set of KEKs to support the different cryptographic functions, e.g. Enc/Dec/MAC/Ver), etc.

4.4.3.3 Base Key Set Renewal

The KS has the ability to request that a specific instance of a base key can be changed. In order to eliminate any disruption to the CS, baseline keys use the concept of an old, current and new key. This requires that there is a pre-distribution of the new baseline keys before the key activation period. The use of this method allows for variances in CS clocks. The method includes:

1. KS generates the next specific base key instance based on the Key Metadata
2. KS can use the Query commands for end point and key residency to determine the crypto engines and loaded keys on each server.
3. Based on the findings of the Query commands the KS can issue a base key roll over command to each crypto engine on a server.
4. On receipt of a base key roll over command the CS loads the new key into the new key slot.
5. The CS marks the old key for deletion, moves the current key to the old key slot and the new key to the current key slot.
6. If all the key movers are successful then the old key marked for deletion is discarded; otherwise the value is rolled back to their original positions.

The KS distributes Keys under what it believes to be the current KEK. If the CS signals ‘key not found’, then the KS will try under the new KEK, if it has been generated; if the CS still signals ‘key not found’, then the KS will try under the old KEK; if the CS still signals ‘key not found’, this will trigger a key roll over using the current key.

The CS checks for the explicit instance of the KEK in all three of the possible slots.

5. Server Components

Figure 6:
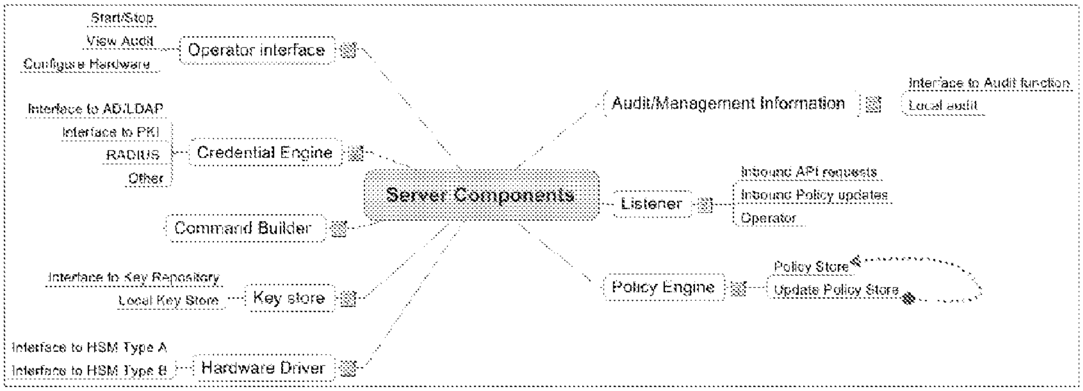
FIG. 6 is diagram illustrating the server structure implementing a centralised encryption framework in accordance with the embodiment.

FIG. 6 illustrates the server components implementing a centralised encryption system in accordance with an embodiment of the present invention.

5.1 Audit/Management Information

The system utilizes a logging infrastructure to maintain logs that may enable postprocessing by various systems to achieve one or more of the following functions.

- Monitoring availability and correct functioning of the system
- Monitoring and detecting attacks on the system
- Monitoring abuse of the system by authorised users (people who do have access using it above and beyond their entitlement)
- Enabling charging of different users or groups of users based upon number of transactions executed (cryptography as a pay-per-use service)
- Diagnosing and analysing problems with the system Log data can be classified in the following categories:

- Information—Reports what has happened successfully. This type of entry is the basis for transaction charging.
- Action—Actions that the CS has taken.
- Warning—For things that will start to impact operational stability of system, such as CPU load high/saturating, disk space/log file dump fails or imminent fails, connections/other resources, low memory, etc.
- Error—E.g. connectivity failures to external events (including timeouts), HSM failures, LDAP group not found corresponding to policy group, etc.
- Fatal—Operational stability of CS itself is failing.

Audit information is protected via signature against alteration. Audit information is in a standard format. The information to be collected include:

- Who accesses
- What was performed
- When was it done
- Performance metrics (how much resource was used/calls made/time taken etc.)

The Audit/MI component interfaces to an existing audit service. The server has the ability to cache audit records if the Audit/MI service is unavailable and the logs cannot be uploaded. The audit records incorporate cryptographic mechanisms to prevent alteration of a record/audit file and deletion/re-sequence of audit records.

The Audit function requires an authenticated/secure time source.

5.2 Listener

The Listener supports the following services and routes the commands:

- Operator interface—the operators interact via a web browser interface to the server.
- Policy engine—new policies are pushed from the policy builder to the server.
- KS commands—commands from the KS.
- Inbound Client API requests—application specific commands from the Client API 5.3 Policy Engine The policy engine contains the policy/rule set that defines the behaviour of the server. The policy engine allows the server to control which users get access to which keys. Without the policy engine, it would not be possible to have multiple different applications using the CS safely at the same time. The policy engine also allows the server to control centrally what specific crypto settings are used per transaction. This means applications can have a knowledgeable central authority choose crypto algorithms for them. The policy engine further allows the server to control how keys are used, for instance making them "encrypt only", if for instance the key is for archival. This improves security.

The policy engine receives a copy of the string representation of each command, together with the current identity of the caller from the CS via an interface. The policy engine evaluates whether the caller is entitled to make the requested call, and returns the selected cryptographic parameters (e.g. key length) if appropriate.

Policies are pushed to the engine; updates to the internal policy engine only take place after the new polices have been validated. Polices are stored encrypted in a protected Policy Store in the server store when not in memory. Policies are persisted by the server and cryptographically signed (e.g. using a digital signature) to prevent alteration. Policies can be updated using an operator user interface. A new policy being uploaded is validated by checking of a digital signature, and by dual control approval. The checking of the digital signature ensures that the policy has been approved, and the dual control assures that an old policy file is not being loaded.

5.4 Crypto Engine Driver 5.4.1 Hardware

The Principle interface for hardware-based modules are implemented via PKCS#11 (these are also called HSM type A). For specialist applications/requirements, other vendor specific interfaces to HSMs are supported, e.g. SEE code (these are also called HSM type B).

5.4.2 Software

The Principle interface for software-based modules are implemented via PKCS#11 (these are also called SSM type A). For specialist applications/requirements, other vendor specific interfaces to HSMs are supported, e.g. SEE code (these are also called SSM type B).

5.4.3 Load Balancing

The server may support load balancing. However, if the vendor installation supports load balancing, then this is used in preference.

5.5 Key Store

Keys can be retrieved from a remote KS and stored within a local key store. This local key store is utilised to hold keys frequently used by the Client API in order to reduce the overhead of a key fetch per request. Keys can also be written to a remote KS. The local Key Store may be queried by the remote KS.

Keys can be retrieved from a remote key store and cached in the local key store. Cache of keys on the server may be triggered by a request made during the registration of the Client API. Keys that are cached into the key store as the result of a part of a pre-fetch call are flagged with the ID Token of the caller. When the Logoff command is called, keys associated with the passed ID Token are flushed from the local Key store.

In order to facilitate a Client API failing to issue a logoff command, keys written to the local key store may have an expiry time after which they will be flushed. If the key is required again, a new copy must be fetched.

Keys from the KS are transmitted and stored within PKCS#11 wrappers. Keys may be wrapped under a set of KEKs defined by key function etc, e.g. encrypt, decrypt, MAC, HASH, Sign, and Verify.

The interface to the Key store is responsible for handling Key requests to the KS. This is discussed in detail in section 4 "Key Management Requests".

5.6 Command Builder

The command builder is the processing heart of the server. Its core function of the command builder is to draw together all the information needed to actually run the corresponding command on the HSM. The specific functions supported by command builder are:

- validating Client API request against the policies defined in the Policy store;
- validating that the information returned by the KS is consistent and appropriate with the use requested;
- creating request for keys from either the local key store or from the remote KS;
- constructing relevant hardware/software crypto requests, querying the policy store for any additional information required to complete the command string (e.g. defaults), and verifying the key use information contained in the returned Key information;
- managing the marshalling of the command to the relevant Crypto Engine driver;
- formatting replies to be returned to the Client API;
- generating audit data;
- handling downstream error conditions.

The command builder can send a copy of the augments to the API command to the policy engine, together with contextual information such as the user name, and the policy engine can return a yes/no result that is enforced by the Command Builder within the CS.

The command builder augments the command with key retrieval requests that are satisfied when the command flows through the queue to the key locator stage. The key locator then tries to find the key in the cache and, if it cannot find the key in the cache, contacts the KS.

5.7 Credential Engine

The CS does not need to maintain any credential lists for entities interacting with the server. It can pass the credentials used for verification of the application and the operator identification to an external authentication authority. The engine can pass the authentication request via a credential server. The interfaces to be supported are:

- AD/LDAP
- Interface to PKI (CRL/OCSP) for signature validation
- Radius to support SecurID etc.
- SAML v2

5.8 Operator Interface

The operators can interface to the CS via a browser session over transport layer security (TLS). The operator interface supports strong two-factor authentication. The main functions of the operator interface include:

- configuring the CS both directly and by uploading configuration files;
- starting and stopping HSM providers, and configuring individual HSM settings;
- monitoring the health and performance of the CS and HSMs;
- allowing operators to use smartcards with PINs to logon;
- allowing enrolment, editing and configuration of HSM providers;
- allowing operators to check that the correct HSM is being enrolled;
- dynamically adding and removing HSMs from the cluster without bringing the server down;
- allowing the level of logging made by the CS to be configurable in real time (debug/trace logs turned on and off and so on);
- allowing operators to select the CS client API status, from “Open” (accepts new connections), “Limited” (preserves existing connections) and “Closed” states;
- allowing operators to perform a “stop” operation, which satisfies all pending requests and close all connections—moving from an “Open” state to a “Closed” state; and
- allowing an “emergency stop” operation which instructs the CS to drop all connections and kill associated threads (the threads associated with the operator interface remain active).

Sessions are maintained for operator logon. Session timeout might not be required so that operators can be logged on indefinitely. The operator UI does not replace or supersede any of the HSM provided tools, e.g. the security world management tools for nCipher HSMs.

5.8.1 Server Management

The operator needs to have the ability to start and stop the CS. He also needs to have the ability to control access to the server by each calling API in such a manner that the server can be started in a quiesced state to allow configuration changes to be performed, or be set into a quiesced state which allows the current applications to complete but does not accept new connections. This has the effect of draining the work from the server.

5.8.2 Roles

Role-based access is implemented to segregate the operational tasks that can be performed on the CS. The roles include:

- Audit—allows review of the stored audit logs at all levels of access;
- Operator—allows the starting and stopping of the server as well as the starting and stopping of cryptographic providers and the viewing and flushing of the audit logs; and
- Administrator—allows all the operator function as well as the ability to perform key management operations (enrolment of cryptographic engines) and changes to the configuration of the CS (IP address of supporting services etc).

5.8.3 Audit

The access to view the audit records is controlled by the operator’s profile. The administrator and operator have the ability to view the audit trail and if required initiate a flush of the audit records to the audit server. The audit role is only allowed to view the audit log.

5.8.4 Hardware Configuration

The operator interface supports remote addition, configuration and deletion of cryptographic engine’s associated with the CS.

- Network attached devices: Once the network based device is connected to the network and powered on, it needs to be possible for the operator to remotely perform the steps for crypto engine enrolment without further physical interaction with the hardware device.
- PCI (internal) attached devices: Once the card has been installed within the hardware server and the server started, it needs to be possible for the operator to remotely perform the steps for crypto engine enrolment without further physical interaction with the hardware device. Ideally the addition of a hardware crypto engine would not cause the disruption to an operational server (e.g. plug and play).

Computer Systems

Figure 7:
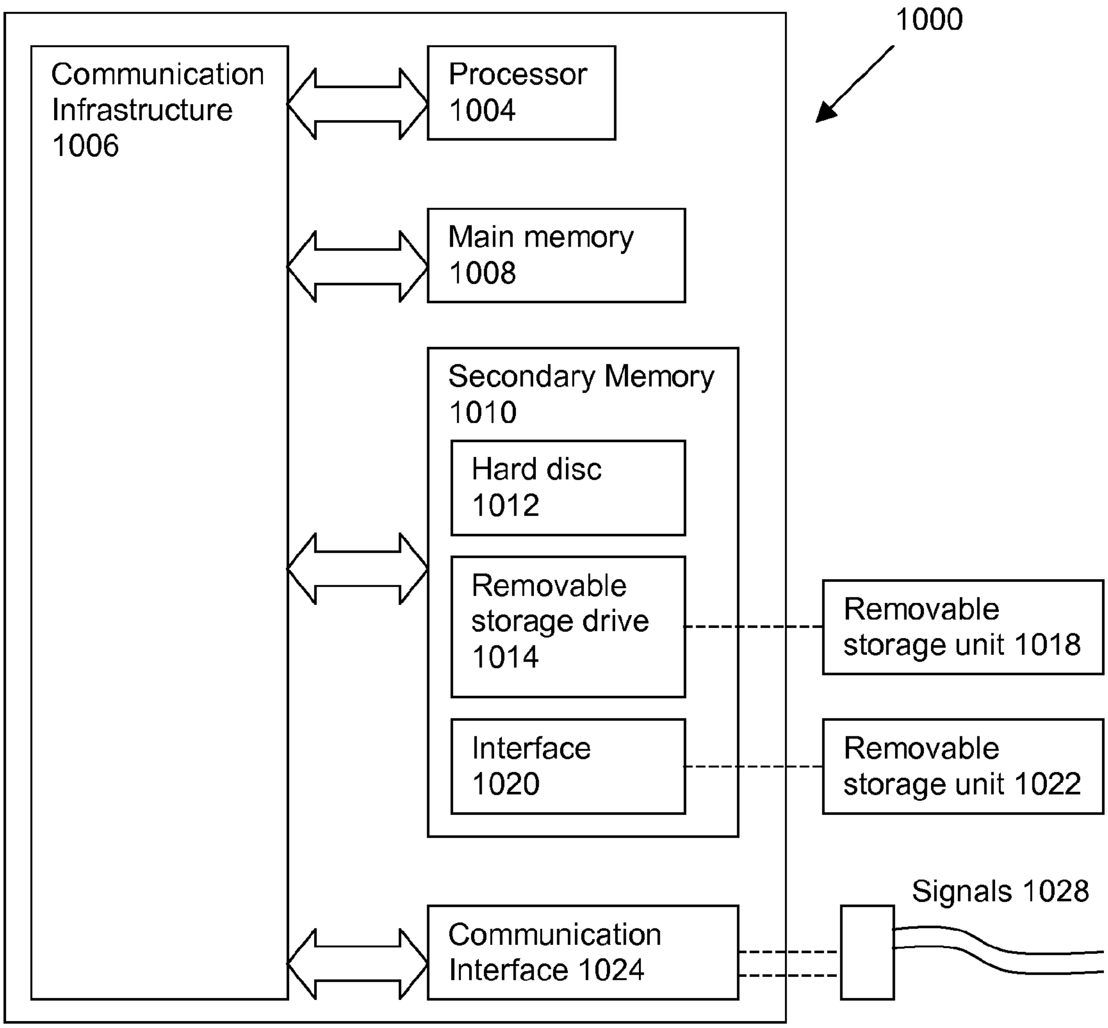
FIG. 7 is a diagram of an example of a computer system on which one or more of the functions of the embodiment may be implemented.

The entities described herein, such as the CS, KS, API, CSP and calling applications, may be implemented by computer systems such as computer system 1000 as shown in FIG. 7. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

Alternative embodiments may be envisaged, which nevertheless fall within the scope of the following claims.

ANNEX I

| CQL Command | Notes | Java Command |
|---|---|---|
| LOGON | Entirely internal. Depends on authentication.<br>LOGON LDAP\DIR1\Username PASS password<br>TICKET <ticket> EXTENDMODE <MODE> | logon(String username, String password)<br>logonPass(String username, String password)<br>logonOTP(String username, String password)<br>logonSMSRequest(String username)<br>logonSMSResponse(String username, String password) |
| EXTEND | Entirely internal. Depends on policy.<br>EXTEND TICKET <ticket><br>TICKET <ticket><br>ERROR <ERROR MSG/ID> | extend( ) |
| FLUSH | Entirely internal.<br>FLUSH TICKET <ticket><br>OK<br>ERROR <ERROR MSG/ID> | flush( ) |
| KEYFETCH | Type A/B<br>KEYFETCH ENCRYPT FROM alice | There may not be a direct java equivalent |

-continued

ANNEX I

| CQL Command | Notes | Java Command |
|---|---|---|
| | TO bob TICKET <ticket><br>OK<br>ERROR <ERROR MSG/ID> | |
| DO ENCRYPT | Type A<br>DO ENCRYPT FROM alice TO bob WITH DATA 010203 TICKET <ticket><br>DATA fasfdsfdsa | Ciphertext encrypt(String from, String to, Plaintext data)<br>Ciphertext encrypt(String from, String to, Plaintext data) |
| DO DECRYPT | Type A<br>DO DECRYPT FROM alice TO bob WITH DATA 010203 TICKET <ticket> | Ciphertext decrypt(String from, String to, Plaintext data) |
| DO UPGRADE | Type A<br>This command would check current policy and old policy (pulling old policy from some archive configured by operator), and if the managed encryption params have changed it upgrades.<br>DO UPGRADE FROM alice TO bob WITH DATA 010203 TICKET <ticket> | Ciphertext upgrade(String from, String to, Ciphertext data) |
| DO SIGN | Type A<br>DO SIGN FROM alice WITH DATA 010203 TICKET <ticket> | Signature sign(String from, Plaintext data) |
| DO VERIFY | Type A<br>DO VERIFY FROM alice WITH DATA 010203 SIGNATURE CF012B TICKET <ticket> | bool verify(String from, Plaintext data, Signature sig) |
| DO MACGENERATE | Type A<br>DO MACGENERATE FROM alice TO bob WITH DATA 010203 TICKET <ticket> | MAC macGenerate(String from, String to, Plaintext data) |
| DO MACVERIFY | Type A<br>DO MACVERIFY FROM alice TO bob WITH DATA 010203 MAC 010203 TICKET <ticket> | bool macVerify(String from, String to, Plaintext data, MAC mac) |
| DO GENRANDOM | Type A<br>DO GENRANDOM BYTES bytes<br>DO GENRANDOM DIGITS 4 | byte[ ] randomBytes(int len)<br>String randomNumberAsString(int digits)<br>int randomNumberAsInt(int digits) |
| DO PINTRANSLATE | Type B<br>DO PINTRANSLATE FROM alice TO bob WITH DATA 010203 TICKET <ticket> | pintranslate(String from, String to, EPB epb) |
| DO VERIFYARQC | Type B<br>DO VERIFYARQC FROM alice TO bob WITH DATA 102030 ARQC 010203 TICKET <ticket> | verifyARQC( ) |

ANNEX II

Encrypting a file for disk storage

```
Input command sequence:
LOGON LDAP\DIR1\MikeSmith PASS helloworld
DO fileencrypt FROM ME TO storage WITH DATA 01010303452024 TICKET 324234234223
The resulting key locator is:
USER LDAP\DIR1\MikeSmith <KeyLocator>
FUNCTION fileencrypt <User>LDAP\DIR1\MikeSmith</User>
BASEFUNCTION ENCRYPT <Function>fileencrypt</Function>
FROM LDAP\DIR1\MikeSmith <BaseFunction>ENCRYPT</BaseFunction>
TO storage <From>LDAP\DIR1\MikeSmith</From>
UID <To>storage</To>
ROLE </KeyLocator>
From this the key server would typically return:
<KeyObject>
<KeyReturnMethod>KEKEncrypted</KeyReturnMethod>
<EncryptedKey>4EB190C9A2FA169CD2FD8867D50D2DFE</EncryptedKey>
<UID>adc83b19e793491b1c6ea0fd8b46cd9f32e592fc</UID>
<KEKID>212</KEKID>
<CacheDuration>3600</CacheDuration>
<KEK>
  <KEKID>212</KEKID>
```

-continued

ANNEX II

```
  <EncryptedKEK>166B40B44ABA4BD606E7EA22CE92708F</EncryptedKEK>
</KEK>
</KeyObject>
Decrypting a managed encrypted file
```

```
Input command sequence:
LOGON LDAP\DIR1\MikeSmith PASS helloworld
DO DECRYPT FROM storage TO ME WITH DATA 01010303452024 TICKET 324234234223
The resulting key locator is:
USER LDAP\DIR1\MikeSmith <KeyLocator>
FUNCTION DECRYPT <User>LDAP\DIR1\MikeSmith</User>
BASEFUNCTION DECRYPT <Function>fileencrypt</Function>
FROM storage <BaseFunction>ENCRYPT</BaseFunction>
TO LDAP\DIR1\MikeSmith <From>storage</From>
UID b0d0b1a486f... <To>LDAP\DIR1\MikeSmith</To>
ROLE <UID>b0d0b1a486f...</UID>
  </KeyLocator>
From this the key server would typically return:
<KeyObject>
<KeyReturnMethod>KEKEncrypted</KeyReturnMethod>
<EncryptedKey>4EB190C9A2FA169CD2FD8867D50D2DFE</EncryptedKey>
<UID>b0d0b1a486f058bf6e50335e3138151fb3442625</UID>
<KEKID>200</KEKID>
<CacheDuration>500</CacheDuration>
<KEK>
  <KEKID>200</KEKID>
  <EncryptedKEK>166B40B44ABA4BD606E7EA22CE92708F</EncryptedKEK>
</KEK>
</KeyObject>
Translating a PIN from encryption with one key to another
```

```
In this example, a "Type B" HSM command is being made, which requires two keys. Note
that this would result in two separate and independent calls to the KS. The KS is not
expected to relate these calls together in any way. Input command sequence:
LOGON LOCAL\TandemSwitchApp PASS helloworld
DO PINTRANSLATE FROM lloyds TO ME WITH EPB 4EB190C9A2FA169C PAN 5641820322125633
TICKET 324234234223
The resulting key locator(s) is:
USER LOCAL\TandemSwitchApp <KeyLocator>
FUNCTION PINTRANSLATE <User>LOCAL\TandemSwitchApp</User>
BASEFUNCTION PINTRANSLATE <Function>PINTRANSLATE</Function>
FROM storage <BaseFunction>PINTRANSLATE</BaseFunction>
TO LDAP\DIR1\MikeSmith <From>lloyds</From>
UID <To>LOCAL\TandemSwitchApp</To>
ROLE source <Role>source</Role>
  </KeyLocator>
USER LOCAL\TandemSwitchApp <KeyLocator>
FUNCTION PINTRANSLATE <User>LOCAL\TandemSwitchApp</User>
BASEFUNCTION PINTRANSLATE <Function>PINTRANSLATE</Function>
FROM storage <BaseFunction>PINTRANSLATE</BaseFunction>
TO LDAP\DIR1\MikeSmith <From>lloyds</From>
UID <To>LOCAL\TandemSwitchApp</To>
ROLE destination <Role>destination</Role>
  </KeyLocator>
From this the key server would typically return the following key objects, containing
HSM-ready keys for a Thales HSM:
<KeyObject>
<KeyReturnMethod>KeyToken</KeyReturnMethod>
<KeyToken>4EB190C9A2FA169CD2FD8867D50D2DFE70BB023C810CA87A</KeyToken>
<UID>b0d0b1a486f058bf6e50335e3138151fb3442625</UID>
<CacheDuration>36000</CacheDuration>
</KeyObject>
<KeyObject>
<KeyReturnMethod>KeyToken</KeyReturnMethod>
<KeyToken>5B711BC4CEEBF2EE692BB9BF752B0F584EB190C9A2FA169C</KeyToken>
<UID>8544c26bdea8adb264d1005c4de33807fee52c06</UID>
<CacheDuration>36000</CacheDuration>
</KeyObject>
```

The invention claimed is:

1. An encryption service system comprising:

an application programming interface (API) separating calling applications, cryptographic servers and key servers executed using a computer processor and configured to:

receive encryption/decryption requests from one or more calling applications, each request comprising information identifying an encryption or decryption operation to be performed on specified data, and an identity of an origin of the data, and/or an identity of a target of the data, and wherein an encryption policy is determined at least in part on the basis of the identity of the origin and/or target; wherein the encryption policy defines a cryptographic mechanism;

request an appropriate cryptographic server to perform the requested encryption/decryption; and send output data in response to the corresponding encryption/decryption requests; and the cryptographic server comprising a computer processor and configured to:

authenticate the calling application and upon successful authentication, return an identifier token, an ID token, wherein the ID token is appended to an ID token chain by the API, and wherein the ID token comprises a reference to an attribute of the calling API, an expiration time for the ID token and mechanism to prevent replay of the ID token;

generate said corresponding output data by applying the encryption or decryption operation to the specified data; and a key server operable to receive a key request from the cryptographic server and to reply with an encrypted key, wherein the key server is operable to send a query command to the cryptographic server, wherein the query command comprises a command to test if a specified key is being used or is resident at the cryptographic server; and wherein the cryptographic server is operable to receive a pre-fetch request from one of said calling applications through the API and to load a defined set of keys into a local key store in response thereto, wherein the keys that are loaded are grouped and flagged by the ID token, when the ID token is deleted the keys are removed from the local key store.

2. The system of claim 1, wherein the encryption policy is further determined at least in part on the basis of the operation to be performed.

3. The system of claim 1, wherein the requests do not specify an encryption key and/or mechanism for the performance of the encryption or decryption operation.

4. The system of claim 1, wherein the specified data is included within each request.

5. The system of claim 1, wherein the operation is an encryption operation, and the encrypted output data comprises managed data.

6. The system of claim 5, wherein the output data identifies an encryption key and cryptographic mechanism.

7. The system of claim 1, wherein the operation is an encryption operation, and the encrypted output data comprises unmanaged data.

8. The system of claim 7, wherein the cryptographic server defines a policy for decryption of the encrypted output data.

9. The system of claim 1, wherein the key server is operable to reply with a key encryption key for the encrypted key.

10. The system of claim 1, wherein the key server is operable to receive a key load command from the cryptographic server, and to load a specified key in response thereto.

11. The system of claim 1, wherein the query command comprises a command to test if a specified cryptographic engine is resident at the cryptographic server.

12. The system of claim 1, wherein the key server is operable to send an action command to the cryptographic server.

13. The system of claim 12, wherein the action command comprises a command to purge a specified key from the cryptographic server.

14. The system of claim 12, wherein the action command comprises a command to force a change of a key.

15. The system of claim 1, wherein the set of keys is defined by a specified list of encryption/decryption operations to perform.

16. The encryption service system of claim 1, wherein the API is operable to allow a calling application to log on prior to requesting encryption/decryption services.

17. The encryption service system of claim 16, wherein the ID token includes an expiry parameter, and API is further operable to request the calling application to renew ID token upon expiry of the ID token.

18. The system of claim 1, wherein the defined set of keys are cleared from local store when the corresponding calling application has logged off.

19. The system of claim 1, wherein each request further comprises information identifying an identity of an origin of the data, and an identity of a target of the data, wherein the identity of the origin of the data comprises the identity of a sender application of the specified data and/or a user associated with the sender application, and wherein the identity of the target of the data comprises the identity of a recipient application of the specified data and/or a user associated with the recipient application.

20. The system of claim 19, wherein the cryptographic server is further configured to: determine, for each request, an encryption policy to be applied to the encryption or decryption operation based at least in part on the identity of the target of the data, wherein the encryption policy defines a cryptographic mechanism; and generate said corresponding output data by applying the encryption or decryption operation to the specified data according to the cryptographic mechanism defined by the determined encryption policy.

21. A method of providing an encryption service comprising:

receiving, at an application programming interface (API) separating calling applications, cryptographic servers and key servers executed using a hardware computer processor, encryption/decryption requests from one or more calling applications, each request comprising information identifying an encryption or decryption operation to be performed on specified input data, an identity of an origin of the data, and/or an identity of a target of the data, and wherein an encryption policy is determined at least in part on the basis of the identity of the origin and/or target; wherein the encryption policy defines a cryptographic mechanism; request an appropriate cryptographic server to perform the requested encryption/decryption; and at the cryptographic server comprising a computer processor, authenticate the calling application and upon successful authentication, return an identifier token, an ID token, wherein the ID token is appended to an ID token chain by the API, and wherein the ID token comprises a reference to an attribute of the calling API, an expiration time for the ID token and mechanism to prevent replay of the ID token;

at the cryptographic server, for each request, performing the requested encryption or decryption operation on the input data according to the cryptographic mechanism defined by the determined encryption policy, to generate corresponding output data; and outputting the corresponding output data at the application programming interface (API): and receiving, at a key server, a key request from the cryptographic server and replying with an encrypted key;

sending, from the key server, a query command to the cryptographic server, wherein the query command comprises a command to test if a specified key is being used or is resident at the cryptographic server; and receiving, at the cryptographic server from one of said calling applications through the API, a pre-fetch request and loading a defined set & keys into a local key store in response thereto, wherein the keys that are loaded are grouped and flagged by the ID token, when the ID token is deleted the keys are removed from the local key store.

22. The method of claim 21, wherein the encryption policy is further determined at least in part on the basis of the operation to be performed.

23. The method of claim 21, wherein the requests do not specify an encryption key and/or mechanism for the performance of the encryption/decryption operation.

24. The method of claim 21, wherein the input data is included within each request.

25. The method of claim 21, wherein the operation is an encryption operation, and the encrypted output data comprises managed data.

26. The method of claim 25, wherein the output data includes an encryption key and cryptographic mechanism identification.

27. The method of claim 21, wherein the operation is an encryption operation, and the encrypted output data comprises unmanaged data.

28. The method of claim 27, wherein the cryptographic server defines a policy for decryption of the encrypted output data.

29. The method of claim 21, wherein the key server replies with a key encryption key for the encrypted key.

30. The method of claim 21, further comprising receiving, at the key server, a key load command from the cryptographic server, and loading a specified key in response thereto.

31. The method of claim 21, wherein the query command comprises a command to test if a specified cryptographic engine is resident at the cryptographic server.

32. The method of claim 21, further comprising sending, from the key server, an action command to the cryptographic server.

33. The method of claim 32, wherein the action command comprises a command to purge a specified key from the cryptographic server.

34. The method of claim 32, wherein the action command comprises a command to force a change of a key.

35. The system of claim 31, wherein the set of keys is defined by a specified list of encryption/decryption operations to perform.

36. The method of claim 21, further comprising a calling application logging on to the cryptographic server prior to requesting encryption services.

37. The method of claim 36, wherein the ID token includes an expiry parameter, and API requests the calling application to renew ID token upon expiry of the ID token.

38. The method of claim 21, including clearing the defined set of keys from the local store when the corresponding calling application has logged off.

39. The method of claim 21, wherein each request further comprises information identifying an identity of an origin of the data, and an identity of a target of the data, wherein the identity of the origin of the data comprises the identity of a sender application of the specified data and/or a user associated with the sender application, and wherein the identity of the target of the data comprises the identity of a recipient application of the specified data and/or a user associated with the recipient application.

40. The method of claim 39, wherein the cryptographic server is further configured to: determine, for each request, an encryption policy to be applied to the encryption or decryption operation based at least in part on the identity of the target of the data, wherein the encryption policy defines a cryptographic mechanism; and generate said corresponding output data by applying the encryption or decryption operation to the specified data according to the cryptographic mechanism defined by the determined encryption policy.

41. A non-transitory computer readable medium having instructions stored thereon which, when executed by a computer processor, cause the processor to perform a method comprising:

receiving, at an application programming interface (API), separating calling applications, cryptographic servers and key servers encryption/decryption requests from one or more calling applications, each request comprising information identifying an encryption or decryption operation to be performed on specified input data, an identity of an origin of the data, and/or an identity of a target of the data, and wherein an encryption policy is determined at least in part on the basis of the identity of the origin and/or target; wherein the encryption policy defines a cryptographic mechanism; and send output data in response to the corresponding encryption requests;

at the cryptographic server, authenticate the calling application and upon successful authentication, return an identifier token, an ID token, wherein the ID token is appended to an ID token chain by the API, and wherein the ID token comprises a reference to an attribute of the calling API, an expiration time for the ID token and mechanism to prevent replay of the ID token;

at the cryptographic server, for each request, performing the requested encryption or decryption operation on the input data, to generate corresponding output data; and outputting the corresponding output data at the application programming interface (API);

receiving, at a key server, a key request from the cryptographic server and replying with an encrypted key;

sending, from the key server, a query command to the cryptographic server, wherein the query command comprises a command to test if a specified key is being used or is resident at the cryptographic server; and receiving, at the cryptographic server from one of said calling applications through the API, a pre-fetch request and loading a defined set of keys into a local key store in response thereto, wherein the keys that are loaded are grouped and flagged by the ID token, when the ID token is deleted the keys are removed from the local key store.

* * * * *